(12) United States Patent
Wu (10) Patent No.: US 9,422,695 B2
(45) Date of Patent: Aug. 23, 2016

(54) WATER FAUCET (71) Applicant: Gary Wu, Homei Township, ChangHua County (TW)

(72) Inventor: Gary Wu, Homei Township, ChangHua County (TW)

( * ) Notice: Subject to any disclaimer, the term of this patent is extended or adjusted under 35 U.S.C. 154(b) by 83 days.

(21) Appl. No.: 14/560,596

(22) Filed: Dec. 4, 2014

(65) Prior Publication Data

US 2016/0160483 A1 Jun. 9, 2016

(51) Int. Cl.
*E03C 1/04* (2006.01)
*E03C 1/02* (2006.01)

(52) U.S. Cl.
CPC ......... *E03C 1/0405* (2013.01); *E03C 2001/026* (2013.01)

(58) Field of Classification Search
CPC .................. E03C 1/0405; E03C 2001/026
USPC .......................................... 137/801; 251/230
See application file for complete search history.

(56) References Cited

U.S. PATENT DOCUMENTS

| 5,806,771 | A * | 9/1998 | Loschelder | B05B 1/1618 239/446 |
| 7,000,854 | B2 * | 2/2006 | Malek | B05B 1/1618 137/625.48 |
| 7,143,997 | B2 | 12/2006 | Kao | |
| 7,328,858 | B2 * | 2/2008 | Bosio | B05B 1/1618 239/443 |
| 8,573,512 | B2 * | 11/2013 | Hu | B05B 1/1663 239/443 |
| 8,727,241 | B2 * | 5/2014 | Bosio | B05B 1/1618 239/446 |
| 2007/0194148 | A1 * | 8/2007 | Rosko | B05B 1/1609 239/526 |
| 2008/0105313 | A1 * | 5/2008 | Gloor | E03C 1/0401 137/801 |
| 2016/0024764 | A1 * | 1/2016 | Lei | E03C 1/08 137/550 |

* cited by examiner

*Primary Examiner* — John K Fristoe, Jr.
*Assistant Examiner* — Daphne M Barry (57) ABSTRACT

A water faucet has a housing, an outlet cover, a valve shaft, a valve base, a pushing rod and a linkage rod. By repeatedly pressing a knob, water supply can be switched between the two different outlet portions, which is easy to operate. A valve shaft is only pushed by the spring such that a stopping loop of the valve shaft firmly contacts the divider of the valve base without leakage.

9 Claims, 14 Drawing Sheets

WATER FAUCET

BACKGROUND OF THE INVENTION

1. Field of the Invention

The present invention relates to a water faucet, and more particularly to a water faucet having switchable water outlet directions.

2. Description of the Related Art

Figure 13:
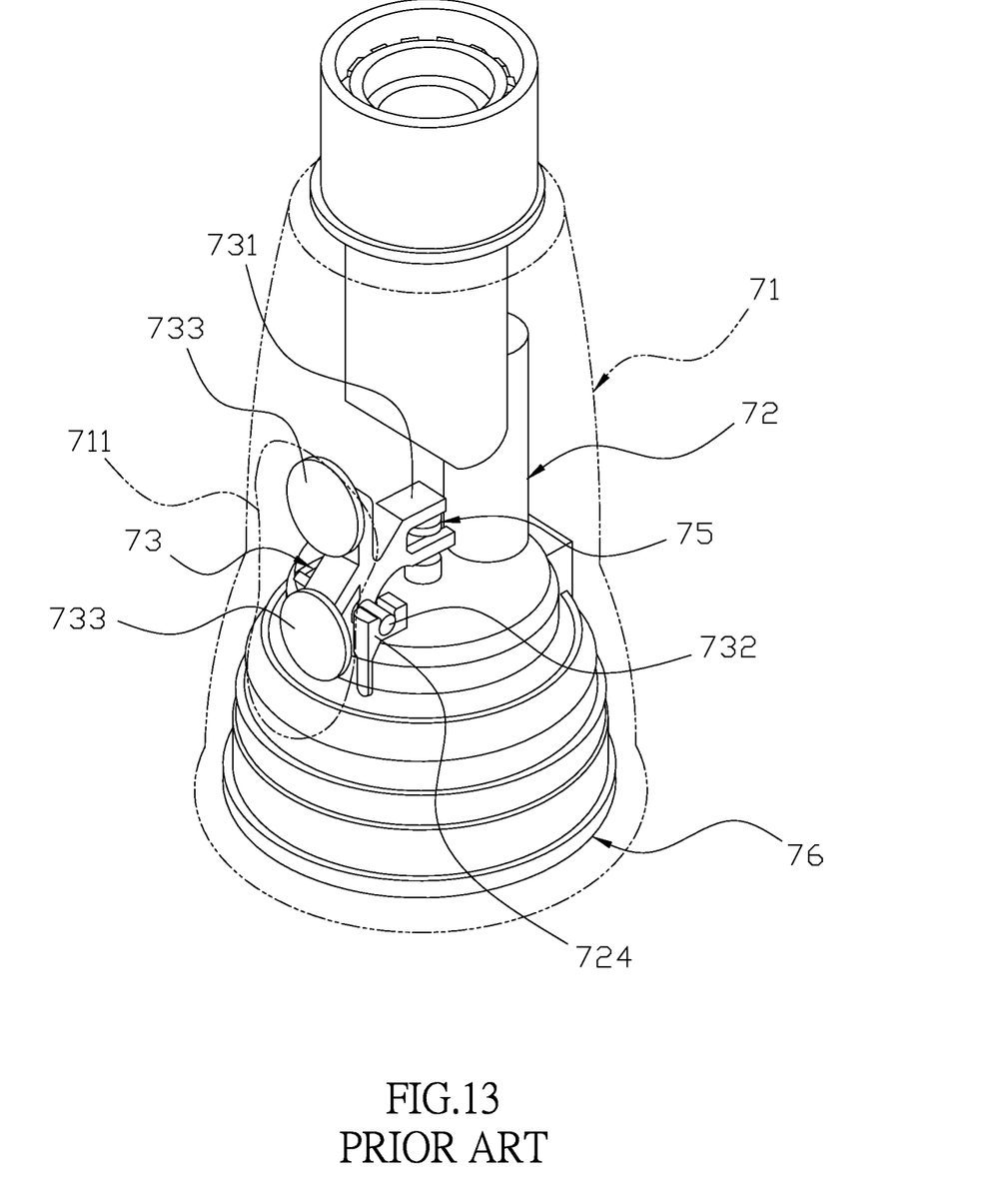
FIG. 13 is a perspective of a prior art water faucet.
Figure 14:
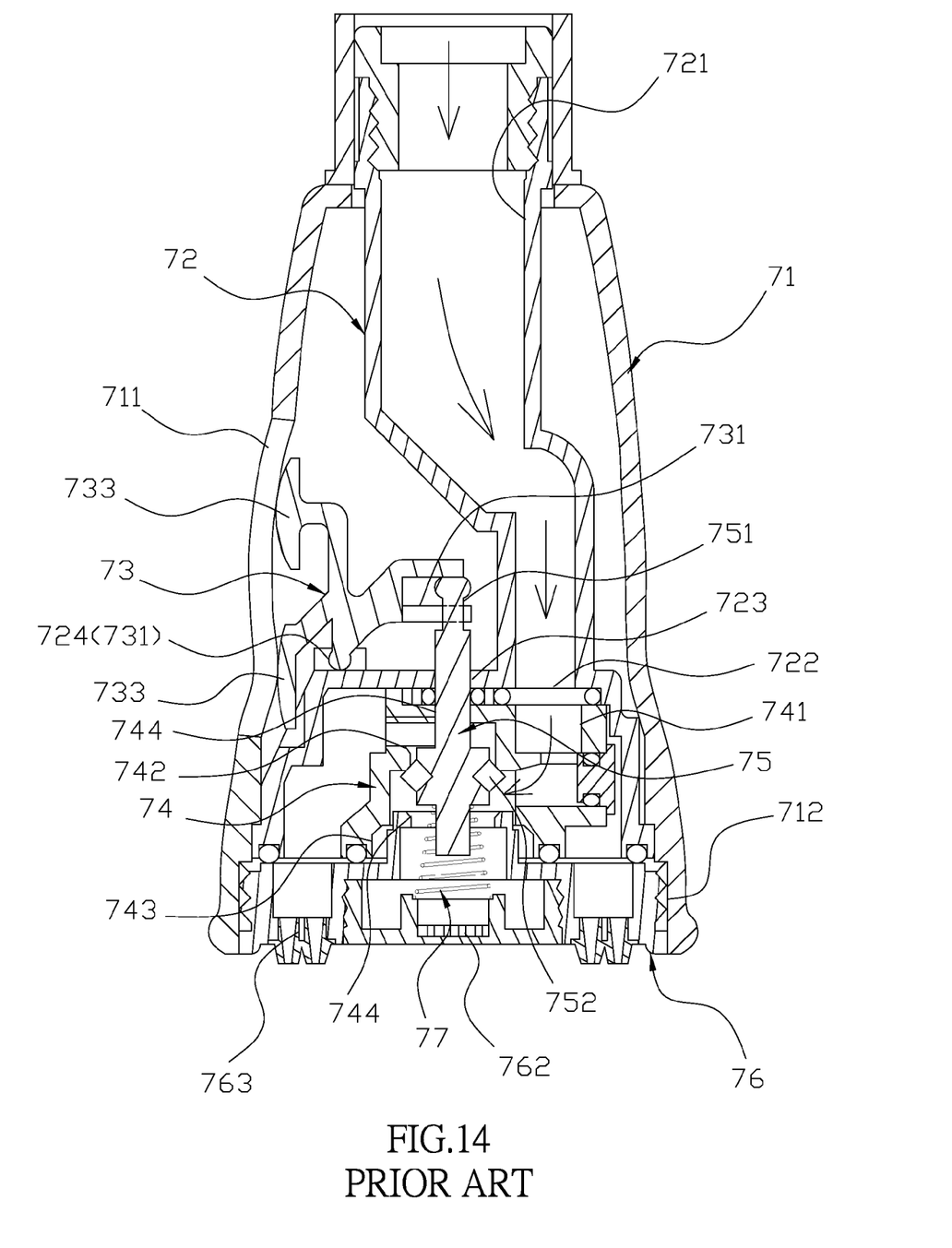
FIG. 14 is a cross-sectional drawing of the prior art water faucet.

Currently, a conventional water faucet channel switch structure, as shown in FIGS. 13 and 14, comprises a housing 71, a conduit 72, a control knob 73, a valve base 74, a valve shaft 75 and an outlet set 76. The housing 71 is hollow, a side of the housing 71 is provided with a through hole 711 and a locking member 712 at an opening The conduit 72 is provided with an inlet opening 721 and an outlet opening 722. The outlet opening 722 is provided with a pivoting aperture 723, and a pivoting base 724 is disposed adjacent to the pivoting aperture 723. The control knob 73 is provided with a linkage member 731 for engaging with the valve shaft 75. The control knob 73 further has a pivoting rod 732 for engaging with the pivoting base 724 and a pressing area 733. The valve base 74 is coupled in the outlet opening 722 of the conduit 72, and has an inlet aperture 741 facing the outlet opening 722. The inlet aperture 741 extends to form a first outlet hole 742 and a second outlet hole 743. A second pivoting aperture 744 is provide between the first outlet hole 742 and the second outlet hole 743. The valve shaft 75 has a linkage portion 751, a stopping portion 752 at one end and a spring 77. The outlet set 76 is provided with an inlet hole 761, a first nozzle 762, and a second nozzle 763. The valve base 74 is coupled to the outlet opening 722 of the conduit 72, and the inlet aperture 741 faces the outlet opening 722. The first and second pivoting apertures 723, 744 face each other; the valve shaft 75 is disposed in the second outlet hole 743 of the valve base 74 and protrudes from the first and second pivoting apertures 723, 744; the control knob 73 utilizes the pivoting rod 732 to engage with the pivoting base 724 of the conduit 72, and the linkage member 731 to engage with linkage portion 751 of the valve shaft 75. The conduit 72 is coupled to the housing 71, the control knob 73 is protrudes for the through hole 711, the spring 77 is placed below the valve shaft 75, and pushes the valve shaft 75 upwardly, and the outlet set 76 is secured onto the locking member 712 of the housing 71. The first nozzle 762 matches the outlet opening 722 of the conduit 72, and the inlet hole 761 enables the second nozzle 763 matches the second outlet hole 743 of the valve base 74.

However, the above-mentioned structure has following problems: (1) By pushing or pulling the control knob 733, the stopping portion 752 of the valve shaft 75 can be moved between and away from the first outlet hole 742 and the inlet hole 761, to switch outcome water between the first nozzle 762 and the second nozzle 763. The two-direction movement can confuse for users. (2) The stopping portion 752 of the valve shaft 75 might reduce the strength of the spring 77, and the valve shaft 75 might not be lifted to contact the valve base 74 which defects the structure.

Therefore, it is desirable to provide a water faucet to mitigate and/or obviate the aforementioned problems.

SUMMARY OF THE INVENTION

An objective of the present invention is to provide a water faucet which has an improved structure.

Another objective of the present invention is to provide a water faucet which provides simple operation.

In order to achieve the above-mentioned objectives, a water faucet has: a housing having a first opening and a second opening, an inlet channel disposed in the first opening, a connecting sleeve disposed in the second opening, the connecting sleeve provided with a through hole, the first opening and the second opening connected via a through aperture, and the through aperture provided with a knob;

an outlet cover having a first outlet portion at a center position, a second outlet portion disposed around the first outlet portion, a stopping sleeve separating the first outlet portion and the second outlet portion, the outlet cover capable of covering the second opening of the housing, and an outer edge of the outlet cover secured onto the connecting sleeve;

a valve shaft having a spring at an end, the spring disposed in the stopping sleeve, a stopping ring and a first controlling ring sequentially disposed on the valve shaft adjacent to the spring, a stopping loop disposed between the stopping ring and the first controlling ring; the stopping loop pushing against the stopping sleeve to seal the first outlet portion;

a valve base having an inner channel and an outer channel, a divider disposed between the inner channel and the outer channel; the stopping loop pressing against the divider to seal the second outlet portion; the valve base placed in the through hole of the second opening and the outlet cover of the housing;

a pushing rod having an inserting aperture, a first skewed tooth loop disposed at an end of the inserting aperture, the pushing rod placed in the inner channel of the valve base; an end of the pushing rod opposite the first skewed tooth loop engaged with the knob; and a linkage rod disposed in the inner channel of the valve base, an end of the linkage rod jacketed onto the column body of the valve shaft, another end inserted into the inserting aperture of the pushing rod to couple together the valve shaft, the pushing rod and the linkage rod.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
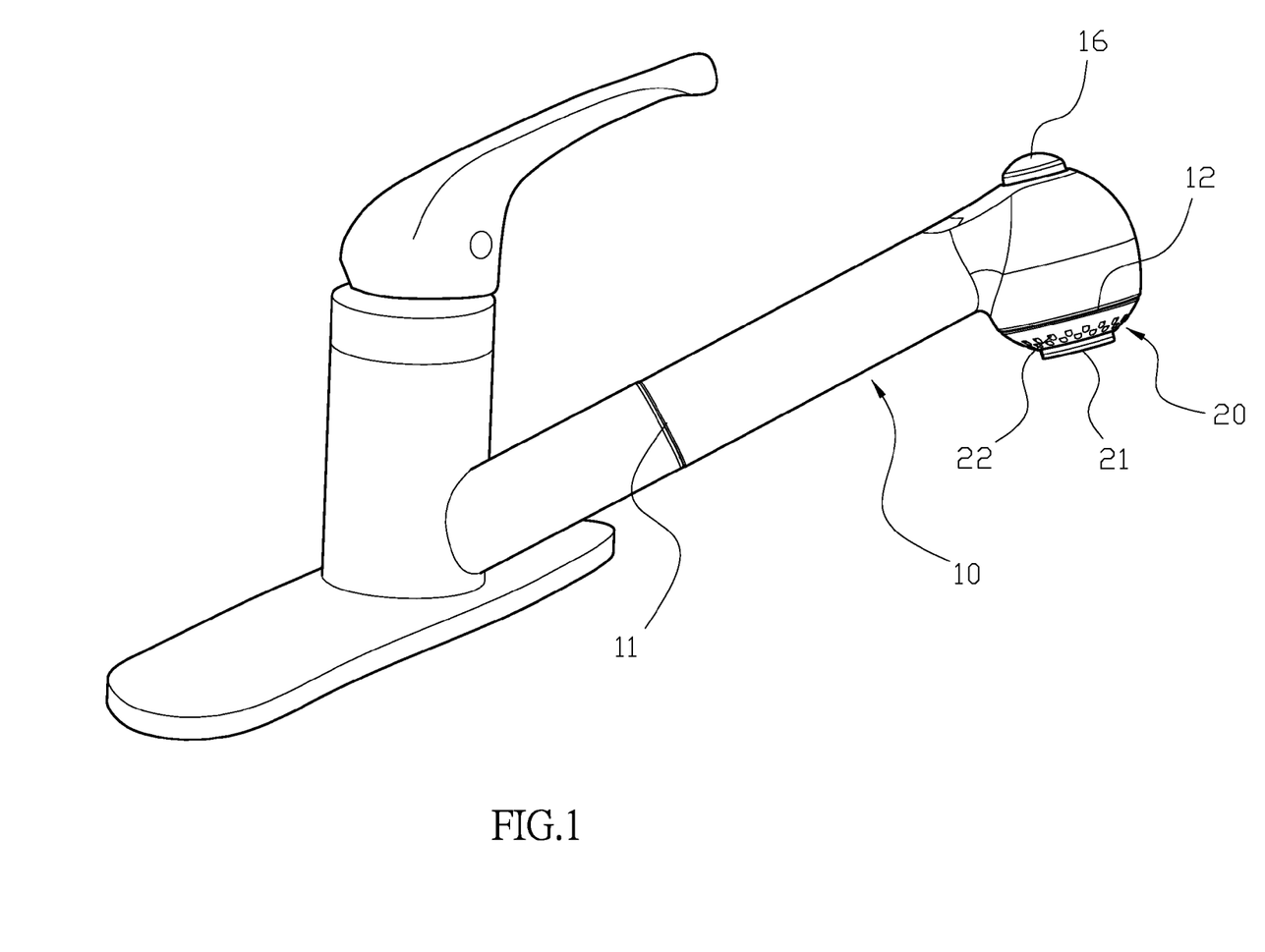
FIG. 1 is a perspective drawing of an embodiment of the present invention.
Figure 2:
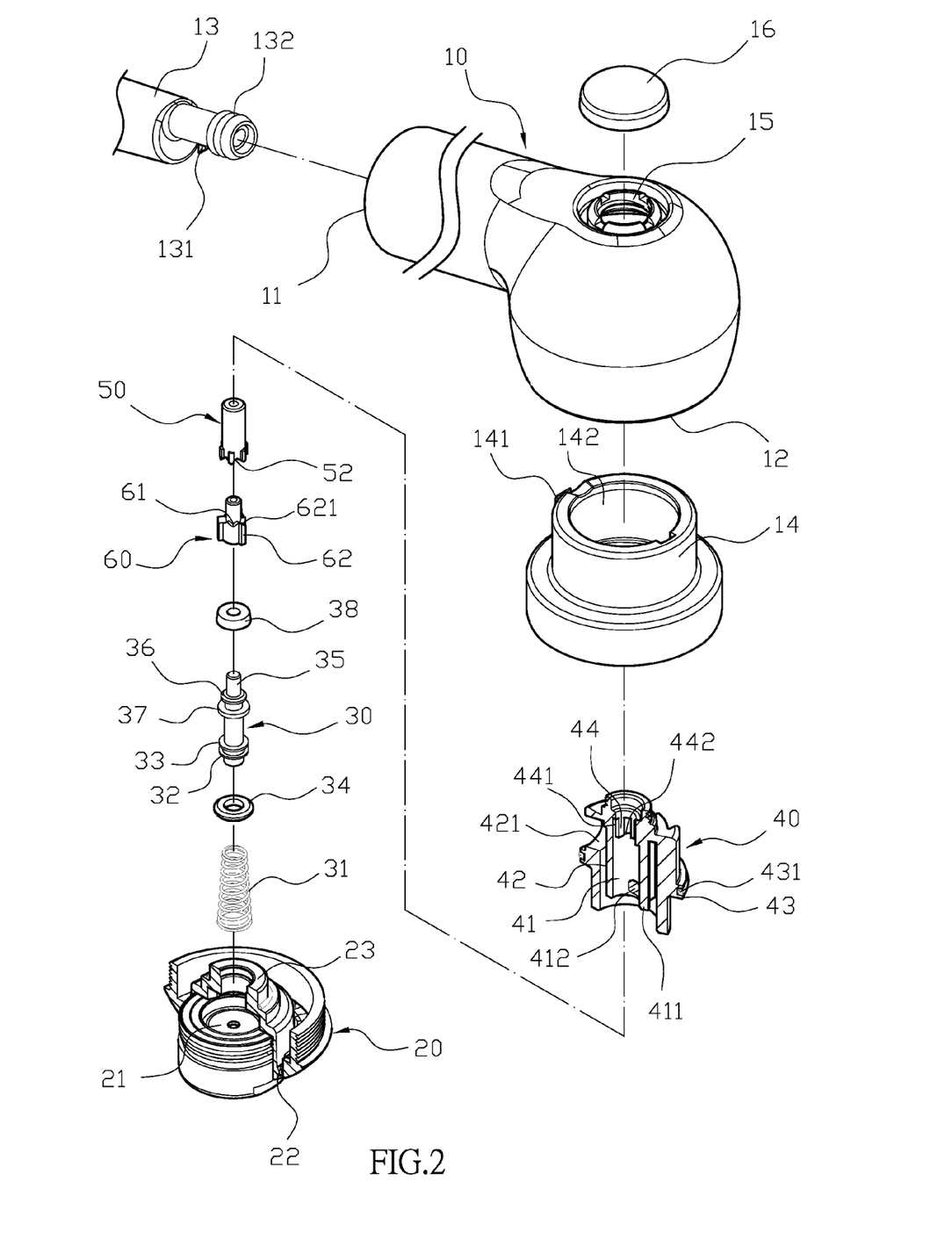
FIG. 2 is an exploded drawing of the embodiment of the present invention.
Figure 3:
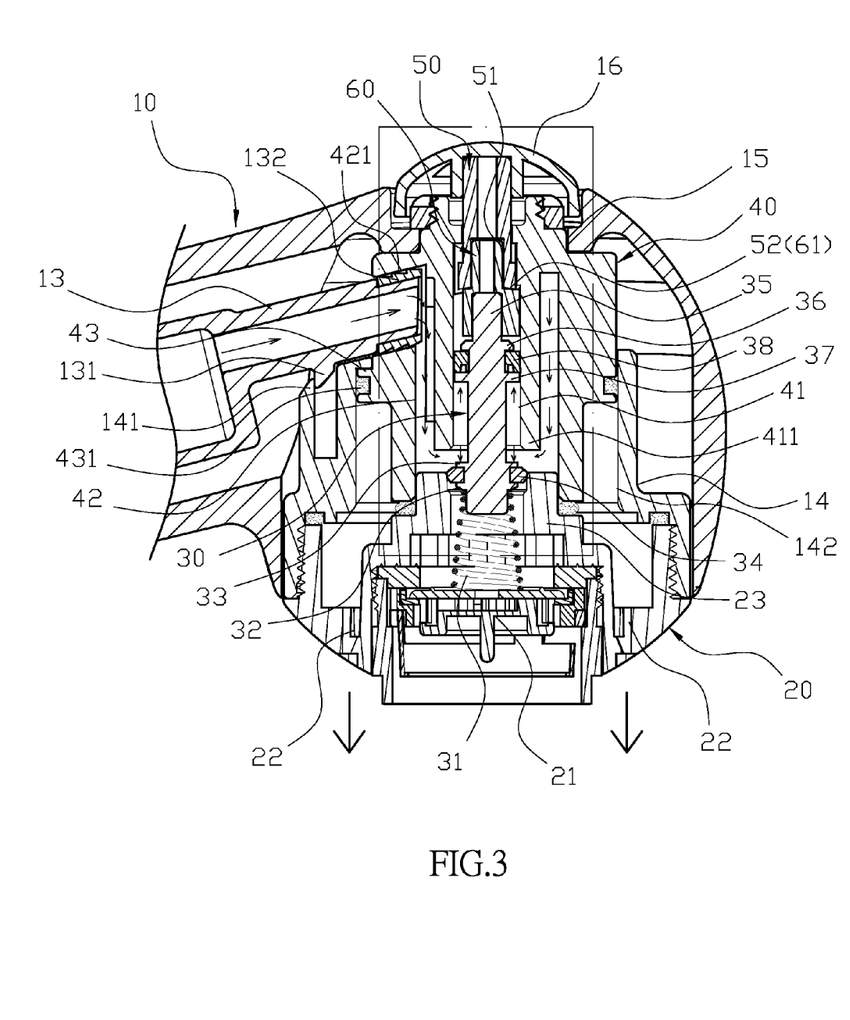
FIG. 3 is a cross-sectional drawing of a second outlet portion of the embodiment of the present invention.

Please refer to FIG. 1, FIG. 2 and FIG. 3. A water faucet comprises: a housing 10, an outlet cover 20, a valve shaft 30, a valve base 40, a pushing rod 50 and a linkage rod 60. The housing 10 has a first opening 11 and a second opening 12, an inlet channel 13 disposed in the first opening 11, and a connecting sleeve 14 disposed in the second opening 12. The inlet channel 13 further comprise a hook 131 and a head portion 132 at a same end, an engaging portion 141 is correspondingly provided on the connecting sleeve14, and the hook 131 engages with the engaging portion 141 to securely combine the inlet channel 13 and the connecting sleeve 14. The connecting sleeve 14 is provided with a through hole 142, the first opening 11 and the second opening 12 are connected via a through aperture 15, and the through aperture 15 is provided with a knob 16. The outlet cover 20 has a first outlet portion 21 at a center position, a second outlet portion 21 disposed around the first outlet portion 21, and a stopping sleeve 23 separating the first outlet portion 21 and the second outlet portion 22. The outlet cover 20 is capable of covering the second opening 12 of the housing 10, and an outer edge of the outlet cover 20 is secured onto the connecting sleeve 14. The valve shaft 30 has a spring 31 at an end, and the spring 31 is disposed in the stopping sleeve 23. A stopping ring 32 and a first controlling ring 33 are sequentially disposed on the valve shaft 30 adjacent to the spring 31, and a stopping loop 34 is disposed between the stopping ring 32 and the first controlling ring 33. The stopping loop 34 pushes against the stopping sleeve 23 to seal the first outlet portion 21. The valve shaft 30 further has a column body 35 at another end of the spring 31, an outer ring 36 and a second controlling ring 37 are sequentially disposed on the valve shaft 30 adjacent to the column body 35, and a seal washer 38 is disposed between the outer ring 36 and the second controlling ring 37. The valve base 40 has an inner channel 41, an outer channel 42, and a divider 411 partially disposed between the inner channel 41 and the outer channel 42. The stopping loop 34 presses against the divider 411 to seal the second outlet portion 22. The valve base 40 is placed in the through hole 142 of the outlet cover 20 and the second opening 12 of the housing 10. A protruding ring 43 is provided on the valve base 40 and a stopping band 431 is disposed on the protruding ring 43. The protruding ring 43 limits the connecting sleeve 14 and utilizes the stopping band 431 to contact the connecting sleeve 14 to provide a seal. The valve base 40 further has an inlet aperture 421 connected to the outer channel 42, and the inlet aperture 421 is used for accepting the head portion 132 of the inlet channel 13. A guiding aperture 412 is disposed on the valve base 40 connected to the inner channel 41, and the guiding aperture 412 connects the inner channel 41 and the through hole 142. A plurality of teeth 44 are disposed on an inner wall of the inner channel 41, with a sliding face 442 and a slot 441 disposed between each two teeth 44. The pushing rod 55 has an inserting aperture 51, a first skewed tooth loop 52 is disposed at an end of the inserting aperture 51. The pushing rod 55 is placed in the inner channel 41 of the valve base 40, and an end of the pushing rod 55 opposite the first skewed tooth loop 52 is engaged with the knob 16. The linkage rod 60 is disposed in the inner channel 41 of the valve base 40, an end of the linkage rod 60 is jacketed onto the column body 35 of the valve shaft 30, and another end of linkage rod 60 is inserted into the inserting aperture 51 of the pushing rod 50 to couple together the valve shaft 30, the pushing rod 50 and the linkage rod 60. The linkage rod 60 further has a second skewed tooth loop 61, the second skewed tooth loop 61 engage with the first skewed tooth loop 52 of the pushing rod 50. Furthermore, a plurality of protruding strips 62 are disposed on the second skewed tooth loop 61, and a pushing face 621 is provided on an end of the protruding strip 62 facing the pushing rod 50.

Figure 4:
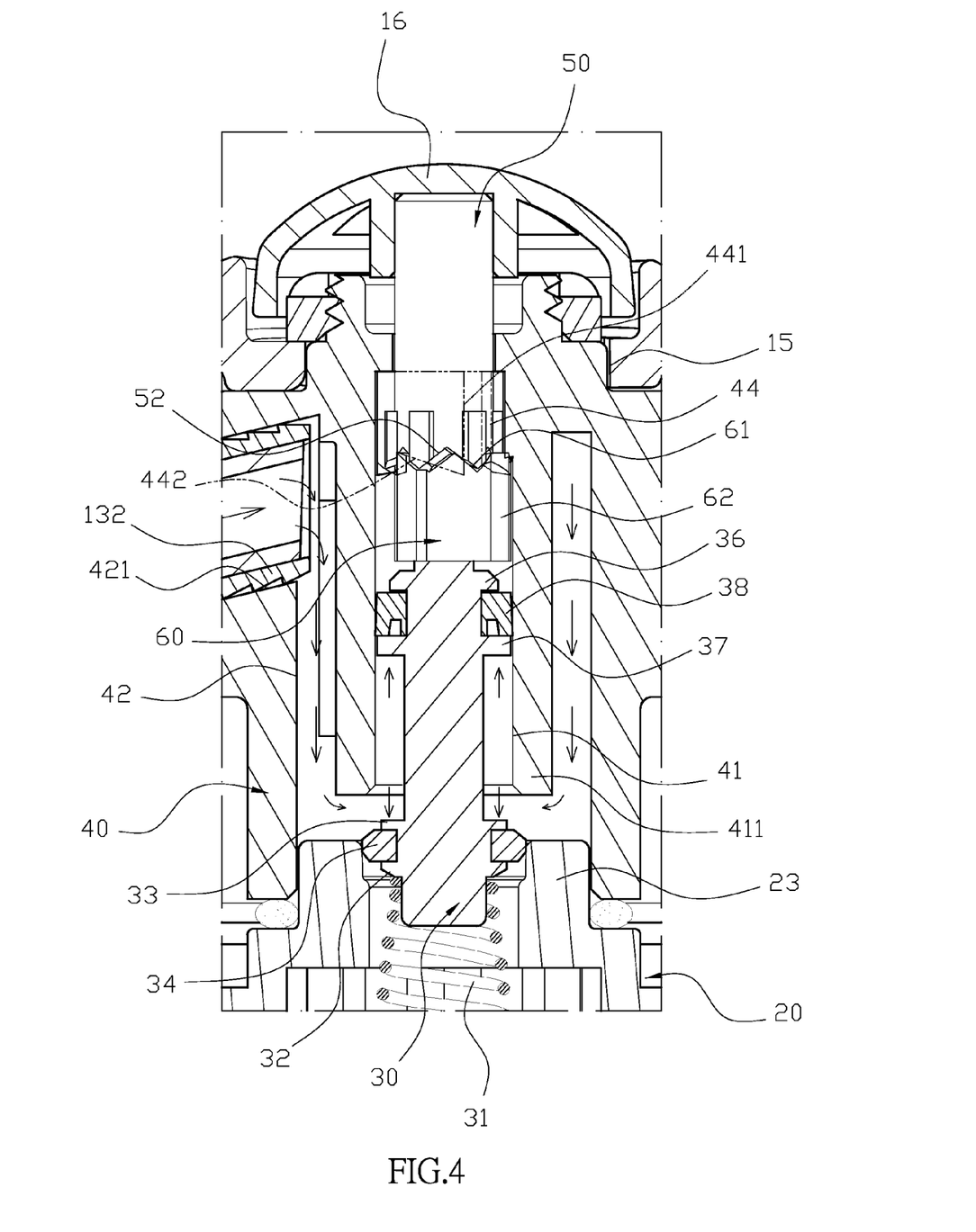
FIG. 4 is a local detail drawing of FIG. 3.
Figure 5:
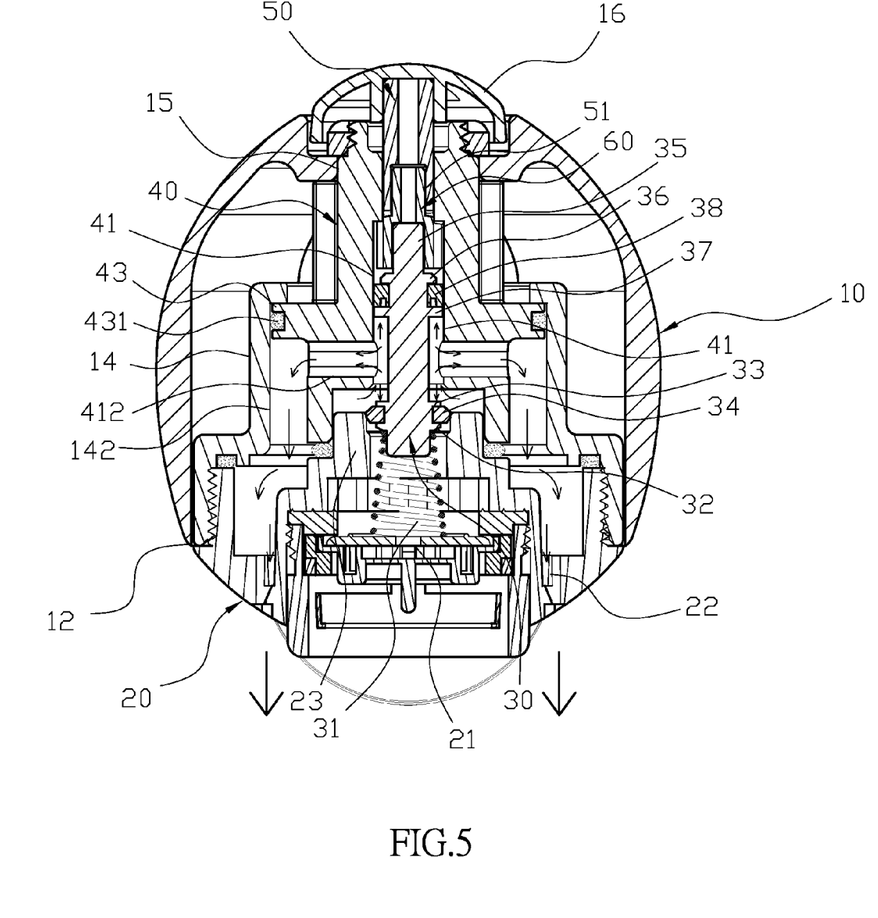
FIG. 5 is another direction of cross-sectional drawing of the second outlet portion of the embodiment of the present invention.
Figure 6:
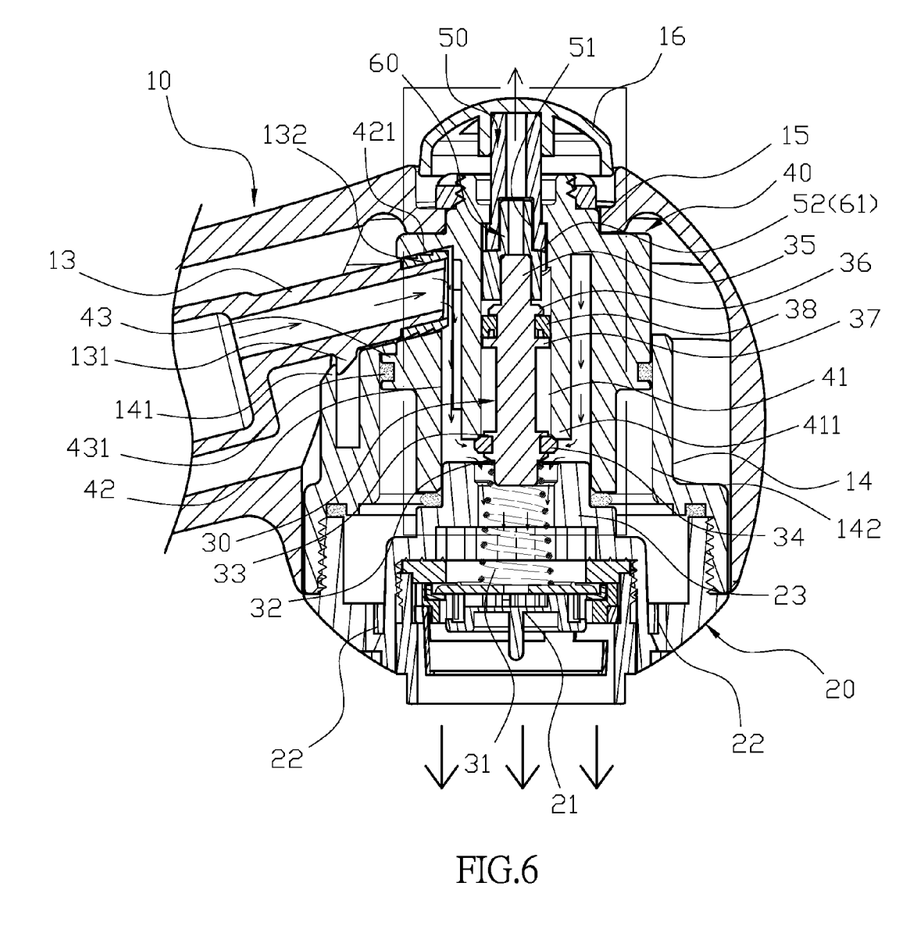
FIG. 6 is a cross-sectional drawing of a first outlet portion of the embodiment of the present invention.
Figure 7:
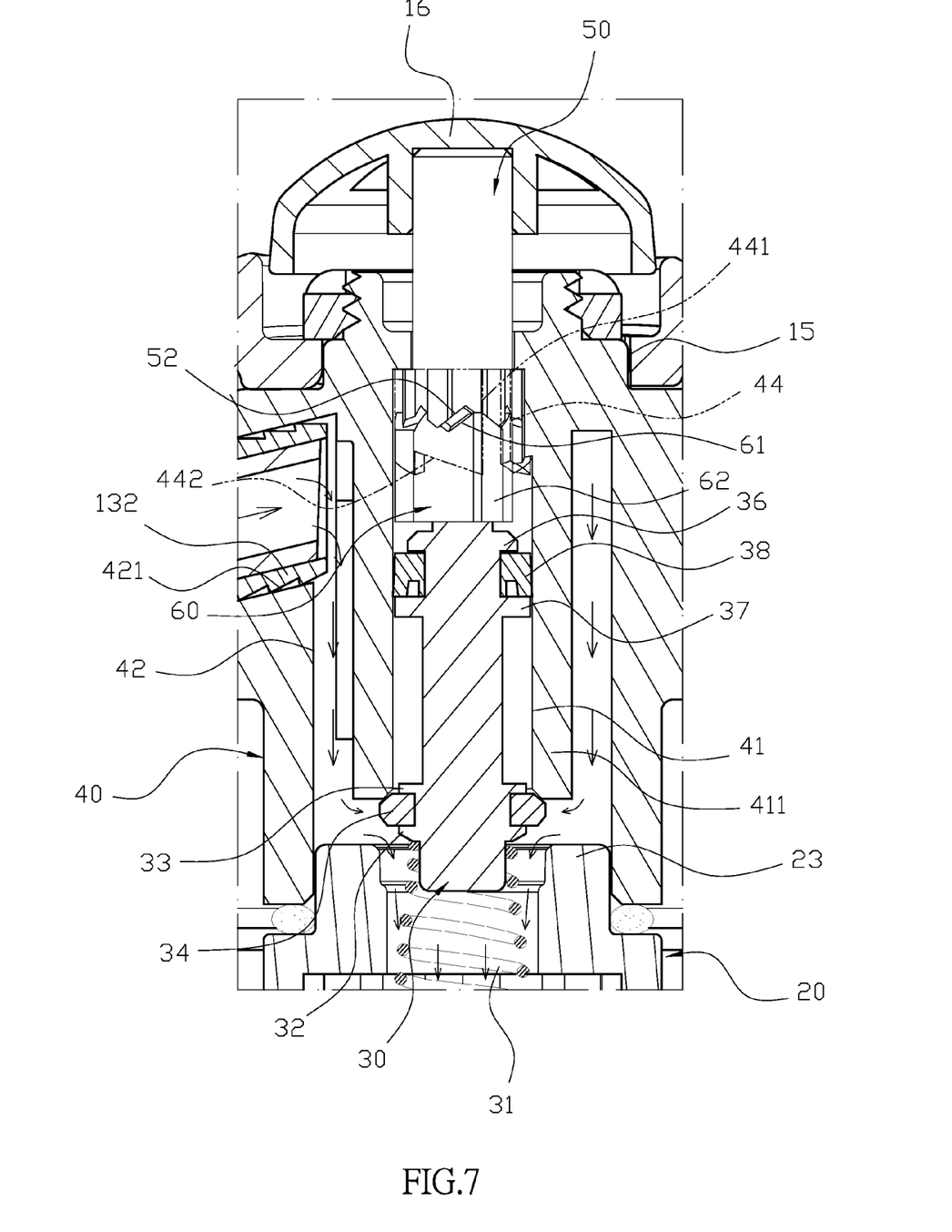
FIG. 7 is a local detail drawing of FIG. 6.

For assembly details, please refer to FIG. 1, FIG. 2 and FIG. 3 again. The connecting sleeve 14 and the valve base 40 are placed in the housing 10 through the second opening 12, the protruding ring 43 of the valve base 40 contacts the connecting sleeve 14 to limit the connecting sleeve 14 and the valve base 40. Then, the inlet channel 13 is inserted into the first opening 11 of the housing 10, such that the head portion 132 is inserted into the inlet aperture 421 of the valve base 40, the hook 131 engages with the engaging portion 141 of the connecting sleeve 14, one end of the linkage rod 60 is inserted into the inserting aperture 51 of the pushing rod 50 such that the second skewed tooth loop 61 of the linkage rod 60 engages with the first skewed tooth loop 52 of the pushing rod 50, one end of the pushing rod 50 is placed in the inner channel 41 of the valve base 40 and protrudes from the through aperture 15 of the housing 10. Afterward, the knob 16 is placed in the through aperture 15 and connected to the pushing rod 50, and the protruding strip 62 of the linkage rod 60 utilizes the pushing face 621 to make contact with the teeth 44 of the valve base 40. The valve shaft 30 is inserted into the inner channel 41 of the valve base 40, the column body 35 of the valve shaft 30 is inserted into the linkage rod 60, the seal washer 38 pushes against the inner channel 41 to provide a seal, which forms a combination of the pushing rod 50, the linkage rod 60 and the valve shaft 30. Last, the spring 31 is placed in the stopping sleeve 23 of the outlet cover 20, the outlet cover 20 covers the second opening 12 of the housing 10 such that another end of the spring 31 contacts the valve shaft 30 and the outlet cover 20 is secured with the connecting sleeve 14. To make water comes out from the second outlet portion 22, as shown in FIG. 4 and FIG. 5, the knob 16 is pressed to control the pushing rod 50 to make the first skewed tooth loop 52 to push the second skewed tooth loop 61 of the linkage rod 60 such that the protruding strip 62 of the linkage rod 60 moves away from the teeth 44. When the protruding strip 62 and the teeth 44 are completely apart, an angle difference between the first skewed tooth loop 52 and the second skewed tooth loop 61 makes the linkage rod 60 to rotate itself and also pushes the valve shaft 30 to make the stopping loop 34 to block the stopping sleeve 23. When the knob 16 is released, the pushing face 621 of the protruding strip 62 of the linkage rod 60 slides onto the sliding face 442 of the valve base 40, to position the sliding face 442 corresponding to the linkage rod 60. When water flows from the inlet channel 13 into the inlet aperture 421 of the valve base 40, through the outer channel 42 into the inner channel 41 of the valve base 40, and then exits from the guiding aperture 412 of the valve base 40 to enter into the second outlet portion 22 of the outlet cover 20 from the through hole 142 of the connecting sleeve 14. To make water comes out from the first outlet portion 21, as shown in FIG. 6 and FIG. 7, the knob 16 is pressed to control the pushing rod 50 to make the first skewed tooth loop 52 to push the second skewed tooth loop 61 of the linkage rod 60, such that the protruding strip 62 of the linkage rod 60 moves away from the teeth 44. When the protruding strip 62 and the teeth 44 are completely apart, an angle difference between the first skewed tooth loop 52 and the second skewed tooth loop 61 makes the linkage rod 60 to rotate itself. By releasing the knob 16, the pushing face 621 of the protruding strip 62 of the linkage rod 60 slides into the slot 441 of the valve base 40 to position the linkage rod 60 such that the spring 31 pushes the valve shaft 30 to make the stopping loop 34 of the valve shaft 30 to make contact with the divider 411 of the valve base 40 and blocks the outer channels 41(42). Accordingly, water flows from the inlet channel 13 into the inlet aperture 421 of the valve base 40, through the outer channel 42 and the stopping sleeve 23, then enters into the first outlet portion 21 of the outlet cover 20.

With the above-mentioned structure, following benefits can be obtained: (1) By repeatedly pressing the knob 16, the protruding strip 62 self-rotates between the sliding face 442 and the slot 441 to switch water supply between the first outlet portion 21 or the second outlet portion 22, which is easy to operate. (2) Both ends of the valve shaft 30 are respectively provided with the first controlling ring 33 and the second controlling ring 37 to balance the water pressure at two ends of the valve shaft 30; when the stopping loop 34 of the valve shaft 30 moves toward to the divider 411, the valve shaft 30 is only pushed by the spring 31 such that the stopping loop 34 of the valve shaft 30 firmly contacts the divider 411 of the valve base 40 without leakage.

Figure 8:
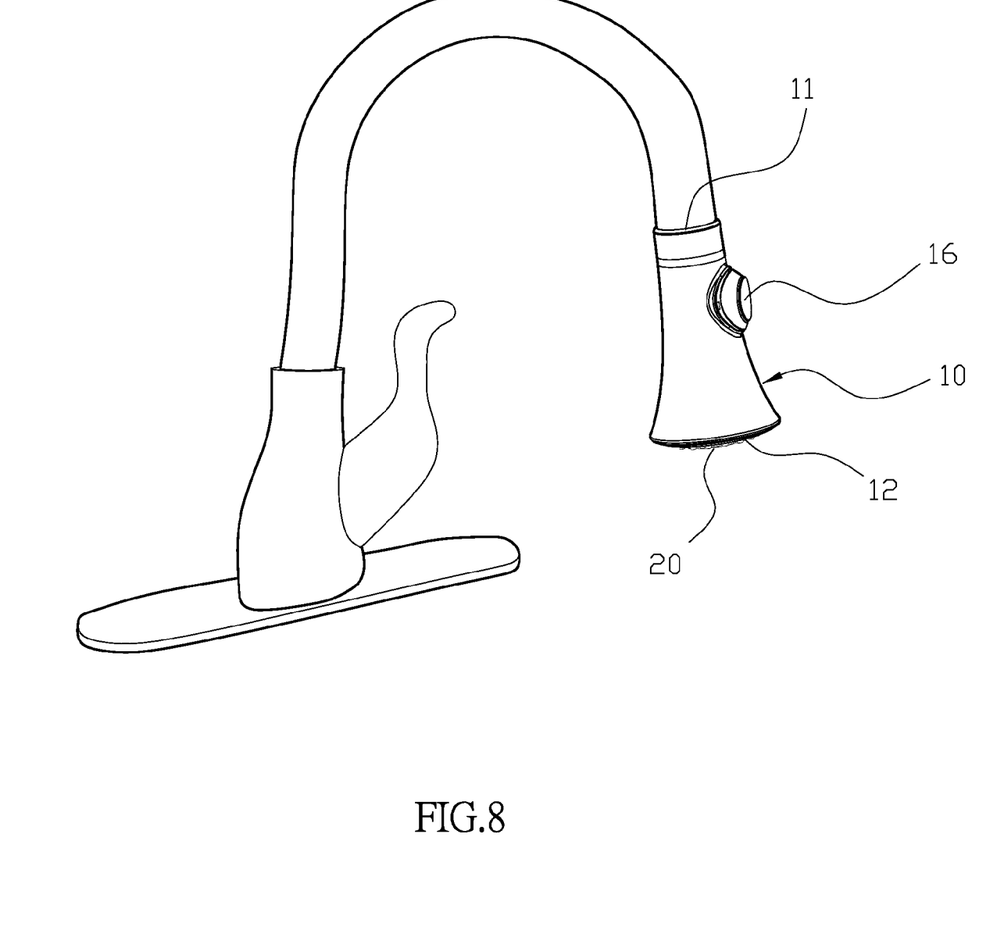
FIG. 8 is a perspective drawing of another embodiment of the present invention.
Figure 9:
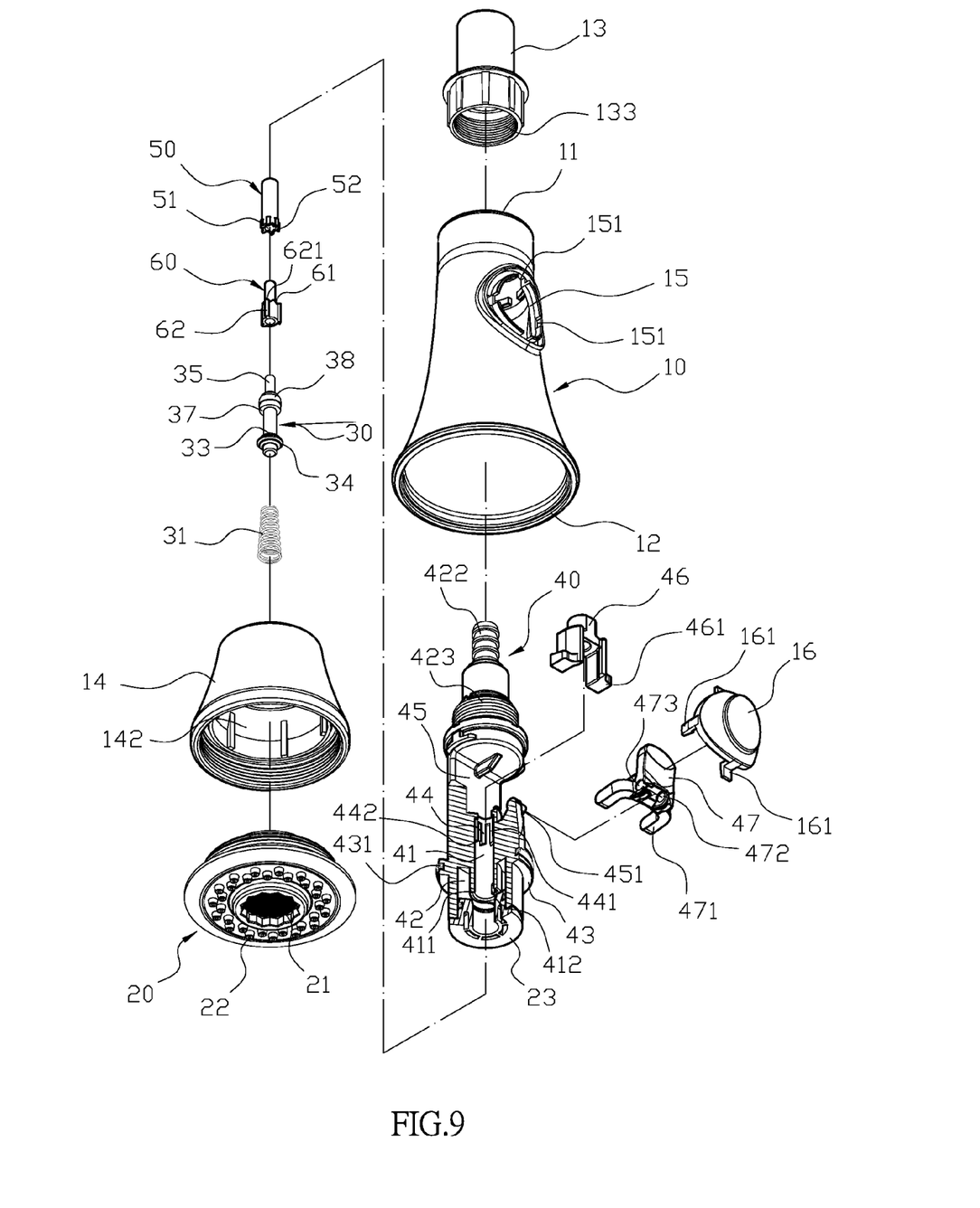
FIG. 9 is an exploded drawing of another embodiment of the present invention.
Figure 10:
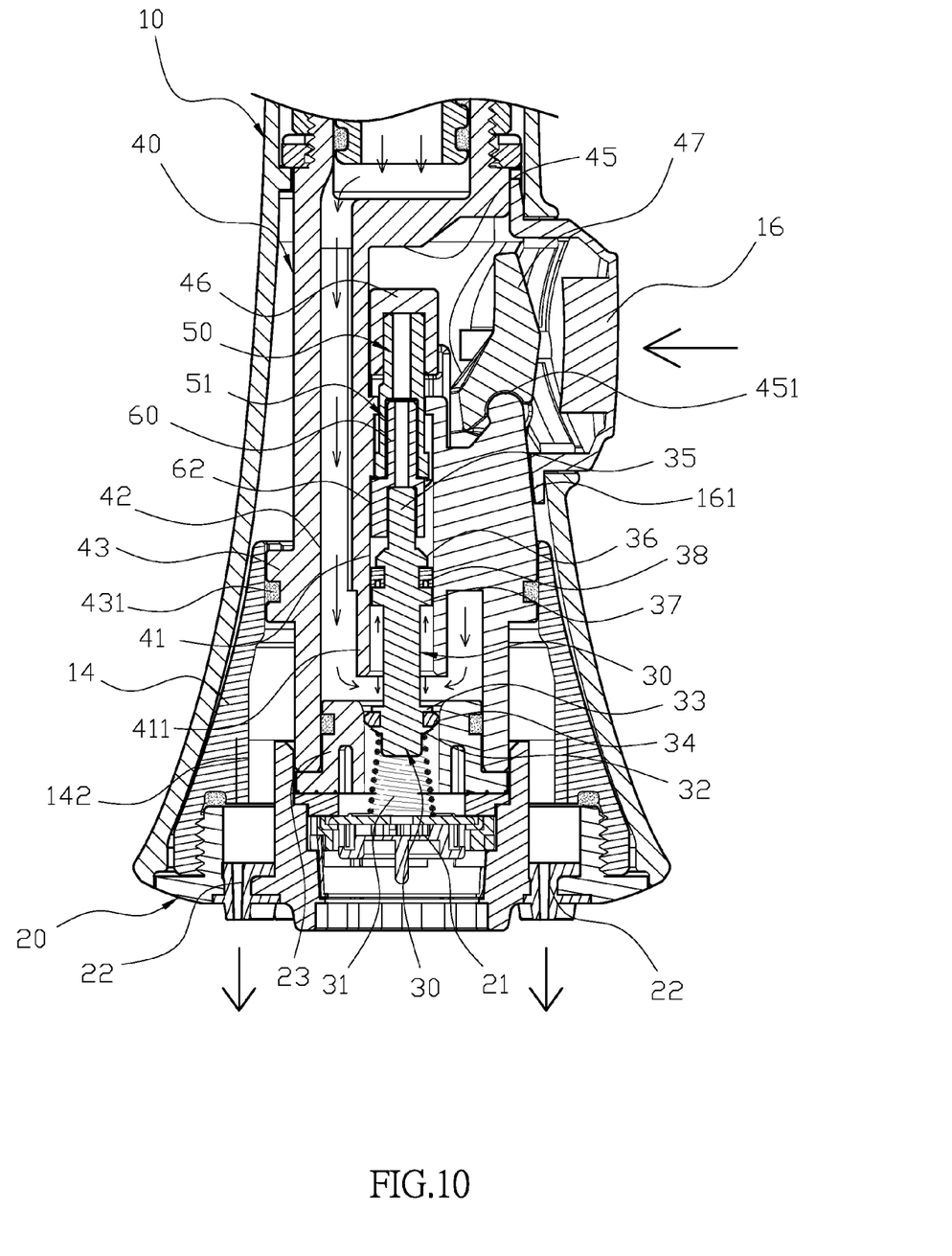
FIG. 10 is a cross-sectional drawing of a second outlet portion of another embodiment of the present invention.
Figure 11:
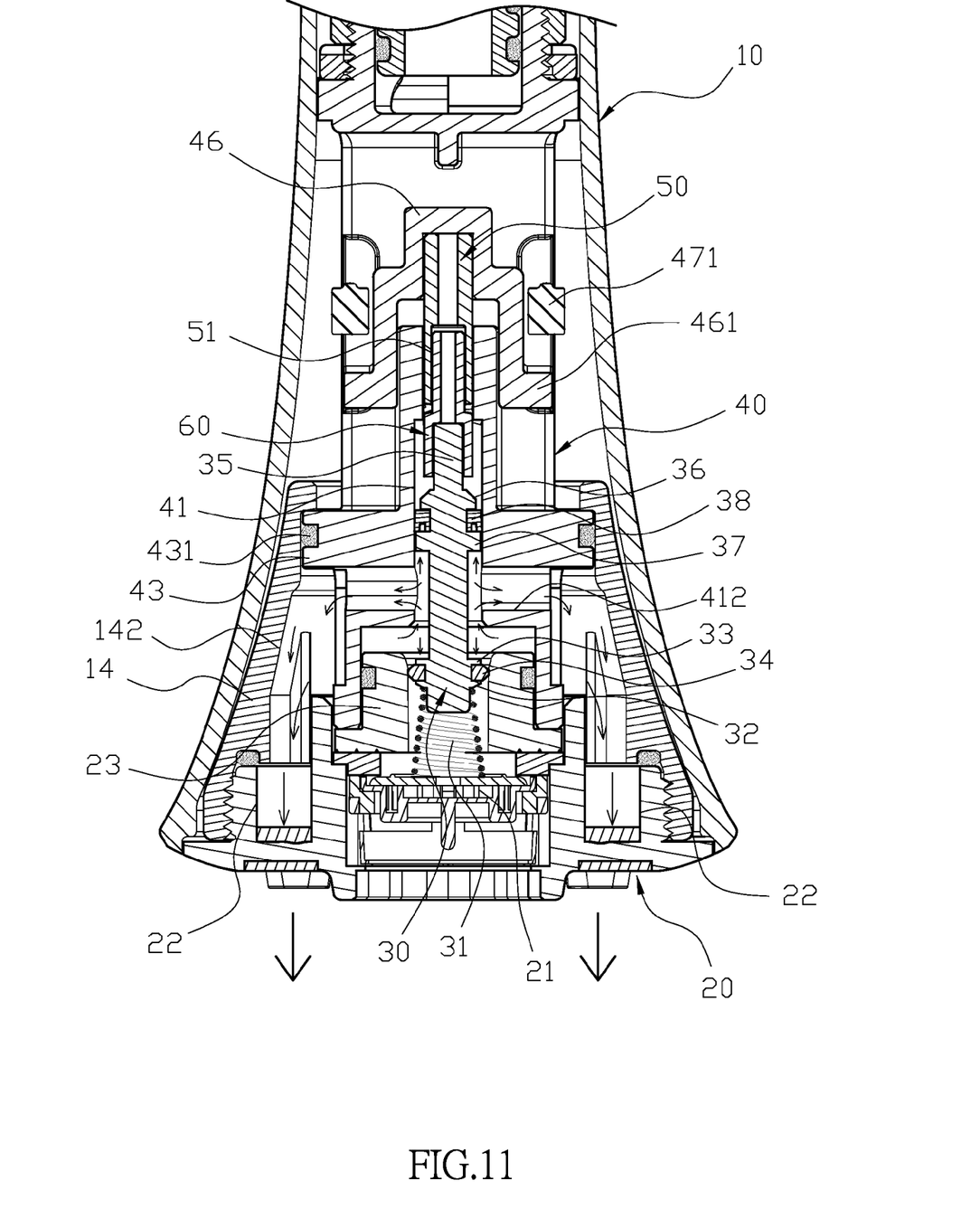
FIG. 11 is another direction of cross-sectional drawing of the second outlet portion of another embodiment of the present invention.
Figure 12:
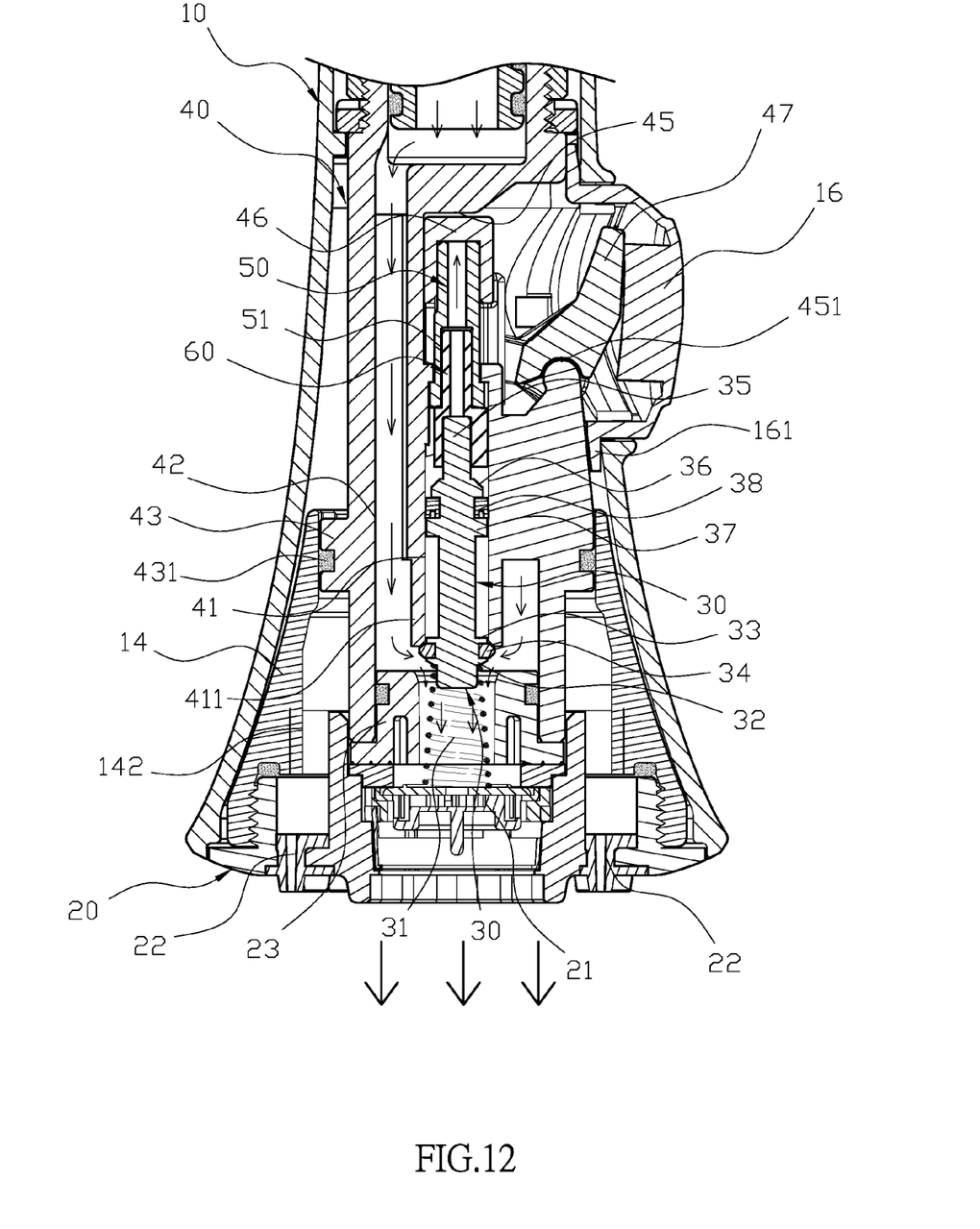
FIG. 12 is a cross-sectional drawing of a first outlet portion of another embodiment of the present invention.

Another embodiment of the present invention, as shown in FIG. 8, FIG. 9 and FIG. 10, the valve base 40 further has a connecting space 45 on its side, which is connected to the inner channel 41. The connecting space 45 is provided with a control member 46, and the control member 46 contacts the pushing rod 50. The connecting space 45 is pivoted with an active member 47 which can be controlled by the knob 16 so the active member 47 is able to drive the control member 46 to move perpendicularly to the knob 16. Moreover, the control member 46 is further respectively provided with a wing 461 at two sides, the active member 47 further respectively has a arms 471 at two sides, and the arm 471 of the active member 47 pushes the wing 461 of the control member 46. The valve base 40 further respectively has a shaft rod 451 at two sides corresponding to the connecting space 45, the active member 47 further has a shaft aperture 472 and a C type hook 473, and the C type hook 473 and the shaft aperture 472 are pivoted onto the shaft rod 451 of the valve base 40. The through aperture 15 of the housing 10 is provided with a plurality of openings 151, a plurality of engaging clips 161 are provided on the knob 16, and the engaging clip 161 of the knob 16 engages with the opening 151 of the housing 10 to position the knob 16. An inner thread 133 is formed in the inlet channel 13, the valve base 40 further has an inlet pipe 422 connected to the outer channel 42, and the inlet pipe 422 is inserted into the inlet channel 13. An outer thread 423 is formed adjacent to the inlet pipe 422 on the valve base 40, and the outer thread 423 is screwed with the inner thread 133 to combine the valve base 40 and the inlet channel 13 together. First, the connecting sleeve 14 is placed in the housing 10, the control member 46 is placed in the connecting space 45 of the valve base 40, the shaft aperture 472 of the active member 47 is jacketed onto the shaft rod 451 of the valve base 40, the C type hook 473 engages with another end of the shaft rod 451, such that the arm 471 of the active member 47 contacts the wing 461 of the control member 46. Then, the valve base 40 is placed in the housing 10, the inlet pipe 422 of the valve base 40 is inserted into the inlet channel 13 at the first opening 11 of the housing 10, the outer thread 423 is screwed with the inner thread 133 of the inlet channel 13, and the protruding ring 43 of the valve base 40 is pushed against the connecting sleeve 14. The knob 16 disposed in the through aperture 15 of the housing 10 interacts with the active member 47, and the engaging clip 161 of the knob 16 engages with the opening 151 of the housing 10 to secure the knob 16. Finally, the inner channel 41 of the valve base 40 is filled with the pushing rod 50, the linkage rod 60 and the valve shaft 30, the outlet cover 20 covers the second opening 12 of the housing 10, and the spring 31 presses against the valve shaft 30 to finish assembly. Please refer to FIG. 11 and FIG. 12. The knob 16 is placed next to the inner channel 41 of the valve base 40, by pressing the knob 16, the active member 47 is pushed to rotate around the shaft rod 451, the arm 471 of the active member 47 pushes the wing 461 of the control member 46, to make the control member 46 to push the pushing rod 50 and the linkage rod 60, such that the valve shaft 30 moves between the stopping sleeve 23 and the divider 411.

Although the present invention has been explained in relation to its preferred embodiment, it is to be understood that many other possible modifications and variations can be made without departing from the spirit and scope of the invention as hereinafter claimed.

What is claimed is:

1. A water faucet comprising:
   a housing having a first opening and a second opening, an inlet channel disposed in the first opening, a connecting sleeve disposed in the second opening, the connecting sleeve provided with a through hole, the first opening and the second opening connected via a through aperture, and the through aperture provided with a knob;
   an outlet cover having a first outlet portion at a center position, a second outlet portion disposed around the first outlet portion, a stopping sleeve separating the first outlet portion and the second outlet portion, the outlet cover capable of covering the second opening of the housing, and an outer edge of the outlet cover secured onto the connecting sleeve;
   a valve shaft having a spring at an end, the spring disposed in the stopping sleeve, a stopping ring and a first controlling ring sequentially disposed on the valve shaft adjacent to the spring, a stopping loop disposed between the stopping ring and the first controlling ring; the stopping loop pushing against the stopping sleeve to seal the first outlet portion; the valve shaft further having a column body at another end of the spring, a outer ring and a second controlling ring sequentially disposed on the valve shaft adjacent to the column body, and a seal washer disposed between the outer ring and the second controlling ring;
   a valve base having an inner channel and an outer channel, a divider disposed between the inner channel and the outer channel; the stopping loop pressing against the divider to seal the second outlet portion; the valve base placed in a hole of the outlet cover and the second opening of the housing; a guiding aperture disposed on the valve base connected to the inner channel, the guiding aperture connecting the inner channel and the through hole; a plurality of teeth disposed on an inner wall of the inner channel, with a sliding face and a slot disposed between each two teeth;
   a pushing rod having an inserting aperture, a first skewed tooth loop disposed at an end of the inserting aperture, the pushing rod placed in the inner channel of the valve base; an end of the pushing rod opposite the first skewed tooth loop engaged with the knob; and
   a linkage rod disposed in the inner channel of the valve base, an end of the linkage rod jacketed onto the column body of the valve shaft, another end inserted into the inserting aperture of the pushing rod to couple together the valve shaft, the pushing rod and the linkage rod; the linkage rod further having a second skewed tooth loop, the second skewed tooth loop engaging with the first skewed tooth loop of the pushing rod, a plurality of protruding strips disposed on the second skewed tooth loop, a pushing face provided on an end of the protruding strip facing the pushing rod.

2. The water faucet as claimed in claim 1, wherein the inlet channel further comprise a hook, an engaging portion is correspondingly provided on the connecting sleeve, and the hook engages with the engaging portion to securely combine the inlet channel and the connecting sleeve.

3. The water faucet as claimed in claim 1, wherein an end of the inlet channel is provided with a head portion, an inlet aperture connected to the outer channel is provided on a sidewall of the valve base, and the head portion of the inlet channel is inserted in the inlet aperture.

4. The water faucet as claimed in claim 1, wherein a protruding ring is provided on the valve base and a stopping band is disposed on the protruding ring.

5. The water faucet as claimed in claim 1, wherein the through aperture of the housing is provided with a plurality of openings, a plurality of engaging clips are provided on the knob, the engaging clip of the knob engages with the opening of the housing.

6. The water faucet as claimed in claim 1, wherein an inner thread is formed in the inlet channel; the valve base further has an inlet pipe connected to the outer channel, the inlet pipe is inserted into the inlet channel; an outer thread is formed adjacent to the inlet pipe on the valve base; the outer thread is screwed with the inner thread to combine the valve base and the inlet channel together.

7. The water faucet as claimed in claim 1, wherein the valve base further has a connecting space which connects to the inner channel; the connecting space is provided with a control member, the control member interacts with the pushing rod; the connecting space is further provided with a pivoted active member, the knob controls movements of the active member such that the active member is capable of driving the control member corresponding to the knob.

8. The water faucet as claimed in claim 1, wherein the control member further respectively has a wing at its two side, the active member further respectively has an arm at its two side, and the active member utilizes the arm to push the wing of the control member.

9. The water faucet as claimed in claim 1, wherein the valve base further respectively has a shaft rod at two sides corresponding to the connecting space, the active member further has a shaft aperture and a C type hook, and the C type hook and the shaft aperture are pivoted onto the shaft rod of the valve base.

* * * * *